(12) United States Patent
Willey

(10) Patent No.: US 9,125,172 B2
(45) Date of Patent: Sep. 1, 2015

(54) APPARATUS, AND ASSOCIATED METHOD, FOR DYNAMICALLY CONFIGURING A PAGE MESSAGE USED TO PAGE AN ACCESS TERMINAL IN A RADIO COMMUNICATION SYSTEM

(75) Inventor: William Daniel Willey, Gilroy, CA (US)

(73) Assignee: BlackBerry Limited, Waterloo, Ontario (CA)

(*) Notice: Subject to any disclaimer, the term of this patent is extended or adjusted under 35 U.S.C. 154(b) by 246 days.

(21) Appl. No.: 13/418,156

(22) Filed: Mar. 12, 2012

(65) Prior Publication Data

US 2012/0172064 A1    Jul. 5, 2012

Related U.S. Application Data

(63) Continuation of application No. 11/841,323, filed on Aug. 20, 2007, now Pat. No. 8,155,674.

(60) Provisional application No. 60/823,213, filed on Aug. 22, 2006.

(51) Int. Cl.
*H04W 68/02*    (2009.01)

(52) U.S. Cl.
CPC .................. *H04W 68/025* (2013.01)

(58) Field of Classification Search
CPC ............................ H04W 68/02; H04W 88/185
USPC ...................................... 370/395.32, 343, 329
See application file for complete search history.

(56) References Cited

U.S. PATENT DOCUMENTS

| | | | |
|---|---|---|---|
| 6,687,285 B1* | 2/2004 | Jou ................................ | 375/133 |
| 6,754,229 B1 | 6/2004 | Islam et al. | |
| 7,061,879 B2 | 6/2006 | Oprescu-Surcobe et al. | |
| 7,672,003 B2 | 3/2010 | Dowling et al. | |

(Continued)

FOREIGN PATENT DOCUMENTS

| | | |
|---|---|---|
| CA | 2612366 A1 | 12/2006 |
| EP | 1004217 B1 | 6/2005 |

(Continued)

OTHER PUBLICATIONS

Qualcomm; "UHDR-One: Connection Layer Design"; 3GPP2-C20-20060626-018R1; Jun. 26, 2006; (Retrieved from the Internet: (ftp://ftp.3gpp2.org/TSGC/Working/2006/2006-06-MiyazakiJapan/TSG-C-2006-06-Miyazaki%20-%20Japan/WG2/C20-20060626-018R1(UHDR-One-ConnectionLayer).pdf); pp. 20 and 21.

(Continued)

*Primary Examiner* — Kwasi Karikari
*Assistant Examiner* — Edward Zhang
(74) *Attorney, Agent, or Firm* — Jon Gibbons; Fleit Gibbons Gutman Bongini & Bianco P.L.

(57) ABSTRACT

Apparatus, and an associated method, for paging an access terminal in a radio communication system. Dynamic configuration and reconfiguration of a quick page message is provided. Its configuration is dependent upon paging load in the system. Hash values are selected and used pursuant to the configuration, and use, of the message. A first hash value is selected within a first range. And, a second hash value is selected within a second range. The second range from which the second hash value is selected does not include the first hash value.

14 Claims, 7 Drawing Sheets

(56) References Cited

U.S. PATENT DOCUMENTS

| | | |
|---|---|---|
| 2002/0093920 A1* | 7/2002 | Neufeld et al. ............... 370/311 |
| 2004/0103291 A1 | 5/2004 | Craft |
| 2006/0019641 A1 | 1/2006 | Vayanos et al. |
| 2006/0098718 A1 | 5/2006 | Sarkar et al. |
| 2006/0194598 A1 | 8/2006 | Kim et al. |
| 2007/0015523 A1* | 1/2007 | Prakash et al. ............... 455/458 |
| 2007/0079106 A1 | 4/2007 | Davis |

FOREIGN PATENT DOCUMENTS

| | | |
|---|---|---|
| EP | 1513368 B1 | 10/2008 |
| WO | 2005/125234 A2 | 12/2005 |
| WO | 2006/071096 A1 | 7/2006 |

OTHER PUBLICATIONS

Rajat Prakash, Qualcomm; "UHDR-One: Mac Layer Overhead Channels"; 3GPP2-C20-20060731-033; Jul. 31, 2006; (Retrieved from the Internet: ftp://ftp.3gpp.org/TSGC/Working/2006/2006-07-Montreal/TSG-C-2006-07-31-Montreal/WG2/C20-20060731-033_QUALCOMM_Overhead%20%Channels.pdf); pp. 8 and 10.

John Harris, Motorola; "Quick Paging Optimization—Falsing Reduction"; 3GPP2 (C22-20060825-003); Aug. 25, 2006; (Retrieved from the Internet: ftp://ftp.3gpp2.org/TSGC/Working/2006/2006-09-Xian/TSG-C-2006-09/WG2/SWG22/Conf_call_contributions/C22-20060825-003_Motorola_MOT_QPCH_Falsing_Reduction.pdf); p. 2.

John Harris, et al., Motorola, Rim, Huawei, RITT & ZTE; Xi'an, China; "Quick Paging Optimization & Performance Analysis"; 3GPP2-C21-20060911-016; Sep. 11-15, 2006; (Retrieved from the Internet: ftp://ftp.3gpp2.org/TSGC/Working/2006/2006-09-Xian/TSG-C-2006-09/WG2/SWG21/C21-20060911-016_MOT_RIM_HUAWEI_RITT_ZTE-QPCH_PERF.pdf); entire document.

Dan Willey, Research in Motion; "Proposed QPCH Structure Using Variable Number of Pls per Page"; 3GPP2-C21-20060911-019, Sep. 11, 2006, Research in Motion, Xi'an, China, (Retrieved from the Internet: ftp:// ftp.3gpp2.org/TSGC/Working/2006/2006-09-Xian/TSG-C-2006-09/WG2/SWG21/C21_20060911-019_RIM_QPCH-structure-updated.pdf); entire document.

* cited by examiner

| # pages | 1PI/page | 2PIs/page | 3PIs/page | 4PIs/page |
|---|---|---|---|---|
| 1 | 0.031312 | 0.003860 | 0.000788 | 0.000206 |
| 2 | 0.061448 | 0.014501 | 0.005370 | 0.002713 |
| 3 | 0.091177 | 0.030442 | 0.015947 | 0.010732 |
| 4 | 0.119634 | 0.051007 | 0.033014 | 0.026806 |
| 5 | 0.146725 | 0.074668 | 0.056151 | 0.051518 |
| 6 | 0.173601 | 0.101735 | 0.084470 | 0.084731 |
| 7 | 0.199310 | 0.130150 | 0.118419 | 0.125937 |
| 8 | 0.224237 | 0.160275 | 0.155403 | 0.173331 |
| 9 | 0.247914 | 0.191291 | 0.194494 | 0.224224 |
| 10 | 0.272184 | 0.223860 | 0.237729 | 0.277346 |
| 11 | 0.294712 | 0.254769 | 0.279438 | 0.331497 |
| 12 | 0.316495 | 0.287440 | 0.321919 | 0.385601 |
| 13 | 0.338279 | 0.319131 | 0.364677 | 0.438213 |
| 14 | 0.358782 | 0.349251 | 0.406274 | 0.489263 |
| 15 | 0.378925 | 0.380182 | 0.446826 | 0.536500 |
| 16 | 0.398024 | 0.410995 | 0.486539 | 0.581273 |
| 17 | 0.417165 | 0.438469 | 0.523377 | 0.623021 |
| 18 | 0.435053 | 0.467009 | 0.558571 | 0.661544 |
| 19 | 0.453186 | 0.494393 | 0.591427 | 0.696711 |
| 20 | 0.469446 | 0.520044 | 0.623922 | 0.729093 |
| 21 | 0.487179 | 0.545456 | 0.653548 | 0.758898 |
| 22 | 0.502658 | 0.569652 | 0.679916 | 0.784957 |
| 23 | 0.517978 | 0.592465 | 0.706977 | 0.808544 |
| 24 | 0.533101 | 0.614371 | 0.730621 | 0.829968 |

FIG. 3

| # pages | 1PI/page | 2PIs/page | 3PIs/page | 4PIs/page |
|---|---|---|---|---|
| 1 | 0.030514 | 0.003570 | 0.000690 | 0.000185 |
| 2 | 0.059622 | 0.013595 | 0.004989 | 0.002437 |
| 3 | 0.087568 | 0.028946 | 0.014690 | 0.009526 |
| 4 | 0.116183 | 0.048358 | 0.030305 | 0.024325 |
| 5 | 0.142611 | 0.071157 | 0.052187 | 0.047373 |
| 6 | 0.168550 | 0.096644 | 0.079287 | 0.078537 |
| 7 | 0.193435 | 0.124123 | 0.110918 | 0.116244 |
| 8 | 0.218118 | 0.152507 | 0.145910 | 0.160950 |
| 9 | 0.241616 | 0.182572 | 0.184237 | 0.210324 |
| 10 | 0.264944 | 0.213467 | 0.224128 | 0.261274 |
| 11 | 0.287361 | 0.244050 | 0.265346 | 0.313415 |
| 12 | 0.308651 | 0.275588 | 0.307023 | 0.365497 |
| 13 | 0.330162 | 0.305959 | 0.348832 | 0.416949 |
| 14 | 0.349581 | 0.337193 | 0.388361 | 0.466904 |
| 15 | 0.370295 | 0.365984 | 0.428539 | 0.514763 |
| 16 | 0.388972 | 0.395555 | 0.467665 | 0.558962 |
| 17 | 0.407173 | 0.422740 | 0.503157 | 0.602103 |
| 18 | 0.425721 | 0.451065 | 0.538096 | 0.640549 |
| 19 | 0.442252 | 0.478090 | 0.572340 | 0.676670 |
| 20 | 0.459532 | 0.505242 | 0.604419 | 0.709189 |
| 21 | 0.475374 | 0.528502 | 0.634383 | 0.739162 |
| 22 | 0.492124 | 0.552706 | 0.661583 | 0.766796 |
| 23 | 0.507754 | 0.576328 | 0.687939 | 0.791229 |
| 24 | 0.521777 | 0.598833 | 0.713252 | 0.813915 |

FIG. 4

| # pages | 1PI/page | 2PIs/page | 3PIs/page | 4PIs/page |
|---|---|---|---|---|
| 1 | 0.029291 | 0.003342 | 0.000628 | 0.000177 |
| 2 | 0.057774 | 0.012871 | 0.004432 | 0.002154 |
| 3 | 0.085539 | 0.027065 | 0.013496 | 0.008751 |
| 4 | 0.112942 | 0.045768 | 0.028153 | 0.022207 |
| 5 | 0.138423 | 0.067572 | 0.048117 | 0.043277 |
| 6 | 0.164129 | 0.091479 | 0.073681 | 0.072480 |
| 7 | 0.188361 | 0.118081 | 0.103676 | 0.107879 |
| 8 | 0.212733 | 0.145704 | 0.137749 | 0.149208 |
| 9 | 0.235751 | 0.174482 | 0.173216 | 0.195591 |
| 10 | 0.258264 | 0.203693 | 0.212558 | 0.244559 |
| 11 | 0.280205 | 0.233786 | 0.251446 | 0.295255 |
| 12 | 0.301179 | 0.264294 | 0.291407 | 0.346275 |
| 13 | 0.321801 | 0.294476 | 0.332107 | 0.396134 |
| 14 | 0.341781 | 0.324218 | 0.371400 | 0.446449 |
| 15 | 0.360452 | 0.352698 | 0.410459 | 0.493249 |
| 16 | 0.379207 | 0.381176 | 0.448393 | 0.537371 |
| 17 | 0.398179 | 0.410355 | 0.484533 | 0.579485 |
| 18 | 0.415620 | 0.435976 | 0.520135 | 0.619071 |
| 19 | 0.433128 | 0.462859 | 0.553232 | 0.655978 |
| 20 | 0.450293 | 0.487979 | 0.585238 | 0.689129 |
| 21 | 0.465659 | 0.514911 | 0.615122 | 0.720404 |
| 22 | 0.480722 | 0.537548 | 0.643517 | 0.748851 |
| 23 | 0.496900 | 0.560941 | 0.669267 | 0.774478 |
| 24 | 0.511700 | 0.582438 | 0.695854 | 0.798233 |

FIG. 5

| # pages | 1PI/page | 2PIs/page | 3PIs/page | 4PIs/page |
|---|---|---|---|---|
| 1 | 0.028948 | 0.003207 | 0.000572 | 0.000140 |
| 2 | 0.056399 | 0.012183 | 0.004325 | 0.001937 |
| 3 | 0.083150 | 0.025707 | 0.012551 | 0.008104 |
| 4 | 0.109473 | 0.043207 | 0.025865 | 0.020072 |
| 5 | 0.135065 | 0.064336 | 0.045009 | 0.039697 |
| 6 | 0.159612 | 0.087171 | 0.069309 | 0.066524 |
| 7 | 0.183832 | 0.112642 | 0.097232 | 0.100251 |
| 8 | 0.207703 | 0.139072 | 0.128781 | 0.139566 |
| 9 | 0.230272 | 0.167184 | 0.164298 | 0.183290 |
| 10 | 0.251586 | 0.195605 | 0.200679 | 0.230028 |
| 11 | 0.272783 | 0.224927 | 0.238656 | 0.279179 |
| 12 | 0.294171 | 0.253597 | 0.277357 | 0.327415 |
| 13 | 0.313517 | 0.283537 | 0.316205 | 0.377876 |
| 14 | 0.333379 | 0.311850 | 0.354264 | 0.425975 |
| 15 | 0.352500 | 0.340696 | 0.393373 | 0.471789 |
| 16 | 0.371408 | 0.369155 | 0.430720 | 0.517164 |
| 17 | 0.389087 | 0.395770 | 0.466273 | 0.559297 |
| 18 | 0.406829 | 0.422080 | 0.501286 | 0.597825 |
| 19 | 0.423717 | 0.447944 | 0.534741 | 0.635965 |
| 20 | 0.440067 | 0.473061 | 0.566691 | 0.670869 |
| 21 | 0.455163 | 0.498452 | 0.596376 | 0.701172 |
| 22 | 0.471446 | 0.522842 | 0.625717 | 0.730849 |
| 23 | 0.487134 | 0.545316 | 0.652725 | 0.757814 |
| 24 | 0.501036 | 0.567611 | 0.677571 | 0.781844 |

FIG. 6

APPARATUS, AND ASSOCIATED METHOD, FOR DYNAMICALLY CONFIGURING A PAGE MESSAGE USED TO PAGE AN ACCESS TERMINAL IN A RADIO COMMUNICATION SYSTEM

CROSS REFERENCE TO RELATED APPLICATIONS

The present application is a continuation application of co-pending U.S. patent application Ser. No. 11/841,323, filed on Aug. 20, 2007, which claims the priority of provisional patent application No. 60/823,213, filed on Aug. 22, 2006. These prior applications are hereby incorporated into the present application by reference.

The present invention relates generally to a manner by which to page an access terminal of a radio communication system to alert the access terminal of a pending call, or other communication. More particularly, the present invention relates to apparatus, and an associated method, that provides for dynamic configuration of a quick page message that is broadcast upon a paging channel, such as a QPCH (quick paging channel) defined in an exemplary cellular communication system. The page message is caused to be configured in a manner dependent upon communication activity, such as paging load. And, if the paging load changes, the configuration of the quick page message is changed. An extended channel information message is generated and sent by the access network to inform an access terminal of the quick page message configuration. The selected page message configuration is selected in a manner best to minimize the occurrence of false wakeup of the access terminal. Excessive battery depletion, as a result of false wakeup of the access terminal, is avoided.

BACKGROUND OF THE INVENTION

Advancements in communication technologies have permitted the development and deployment of new types of communication systems and communication services. Cellular telephony, and associated communication services available therethrough, are popularly utilized by many, typically providing users with communication mobility and also provides the capability of communications when the use of wireline communication systems would not be practical or possible.

While early-generation, cellular communication systems provided primarily for voice communications and only limited data communication services, newer-generation systems increasingly provide for high-speed data communication services at variable data communication rates. A CDMA2000, cellular communication system that provides for EV-DO services is an exemplary type of new-generation, cellular communication system that provides for high-speed data services. Operational details and protocols defining communications and operational requirements of devices of the system are set forth in an operating standard specification. Various aspects of operation of the CDMA2000 EV-DO communication scheme remain to be standardized and certain parts of the existing standard specification are considered for amendment. Various successor-generation communication schemes are also undergoing standardization and yet others are envisioned to be standardized.

For instance, a revision to the standard specification, release B of the CDMA2000 EV-DO specification standard that defines a quick paging channel (QPCH) available upon which to broadcast access-terminal pages by an access network (AN) to an access terminal (AT). The QPCH was adopted in industry contributions 3GPP2 C20-20060323-013R1 and 3GPP2 C20-20060323-003R1 and published in 3GPP2 document C.S0024-B V1.0. Generally, pages are broadcast by the access network to an access terminal to alert the access terminal of a pending communication. And by so alerting the access terminal, the access terminal performs actions to permit the effectuation of the communication. Page indications broadcast upon the quick paging channel are broadcast in a manner that facilitates reduced battery consumption of the access terminal by reducing the battery consumption of the battery of the access terminal. Increased battery longevity is provided, reducing the rate at which a battery of the access terminal must be recharged. The access terminal is, as a result, able to be operated for a greater period of time between rechargings or battery replacement. The aforementioned promulgations provide for broadcast of a message including page indications upon a physical logical layer that is monitored by the access terminal. The access terminal monitors the QPCH prior to monitoring the control channel to receive regular, control channel MAC (medium access control) messages such as page messages. A quick page message is broadcast upon the QPCH that contains quick page indicators. The quick page message includes a number of quick page indicator slots populated with quick page indicators.

During operation, a mobile station hashes to a quick page indicator location, i.e., slot, within the quick page message based upon a session seed, a 32-bit pseudorandom number. If the quick page indicator of the quick page indicator slot to which the access terminal hashes indicates that the access terminal is not being paged, the access terminal enters into a sleep state, a reduced-power state, in which the access terminal does not remain powered at a level to receive the regular control channel MAC messages. Power savings is particularly significant in the event that the control channel MAC messages are lengthy and span multiple control channel frames or capsules.

In the existing scheme, however, the access terminal is susceptible to the occurrence of a false wakeup, that is, the access terminal does not enter into a sleep state but, rather, the access terminal enters into an active state to monitor the regular control channel for reception of regular control channel MAC messages even though there shall be no message for the access terminal. Because the communication system is a multi-user system, there is a possibility that another access terminal that is being paged has its page indication hashed to the same page indication slot. As the number of access terminals that are paged in a system increases, the likelihood of occurrence of a false wakeup correspondingly increases.

Various proposals have been set forth relating to generation, and use, of quick paging messages on a QPCH. The IS-2000 QPCH and the EV-DO Release B Signaling QPCH pertain to quick page messages broadcast on a QPCH. The IS-2000 QPCH is permitting of configuration at either 9600 bps or 4800 bps and also provides for the number of QPCHs to be configurable. The EV-DO release B signaling QPCH permits the number of bits in the quick page message that are dedicated to paging indicators or indications, PIs, to be changed by way of a field in the message, a "quick page indicator count minus one" field.

The QPCH message, as presently-proposed provides thirty-five page indication locations, i.e., bits available to be populated with paging indicators. A proposed "partial hash comparison" scheme utilizes three of the thirty-five page indication locations, thereby reducing the page indication locations available for paging to thirty-two bits. While the proposed, partial hash comparison scheme reduces the false wakeup probability when paging load is relatively low, when the paging load increases, the reduction in the available page indication locations actually increases the possibility of false wakeup. An improvement to the existing proposal is needed as the proposal is beneficial only when the paging load is relatively low.

If a manner could be provided by which to reduce the occurrence of false wakeups, improved battery longevity of the access terminal would be possible.

It is in light of this background information related to paging by an access network of an access terminal that the significant improvements of the present invention have evolved.

BRIEF DESCRIPTION OF THE DRAWINGS

FIGS. 3, 4, 5, and 6 illustrate tables listing exemplary false wakeup probabilities when thirty-two, thirty-three, thirty-four, and thirty-five, respectively, page indication locations in a quick page message are formed and used during operation of the communication system shown in FIG. 1.

DETAILED DESCRIPTION

Figure 1:
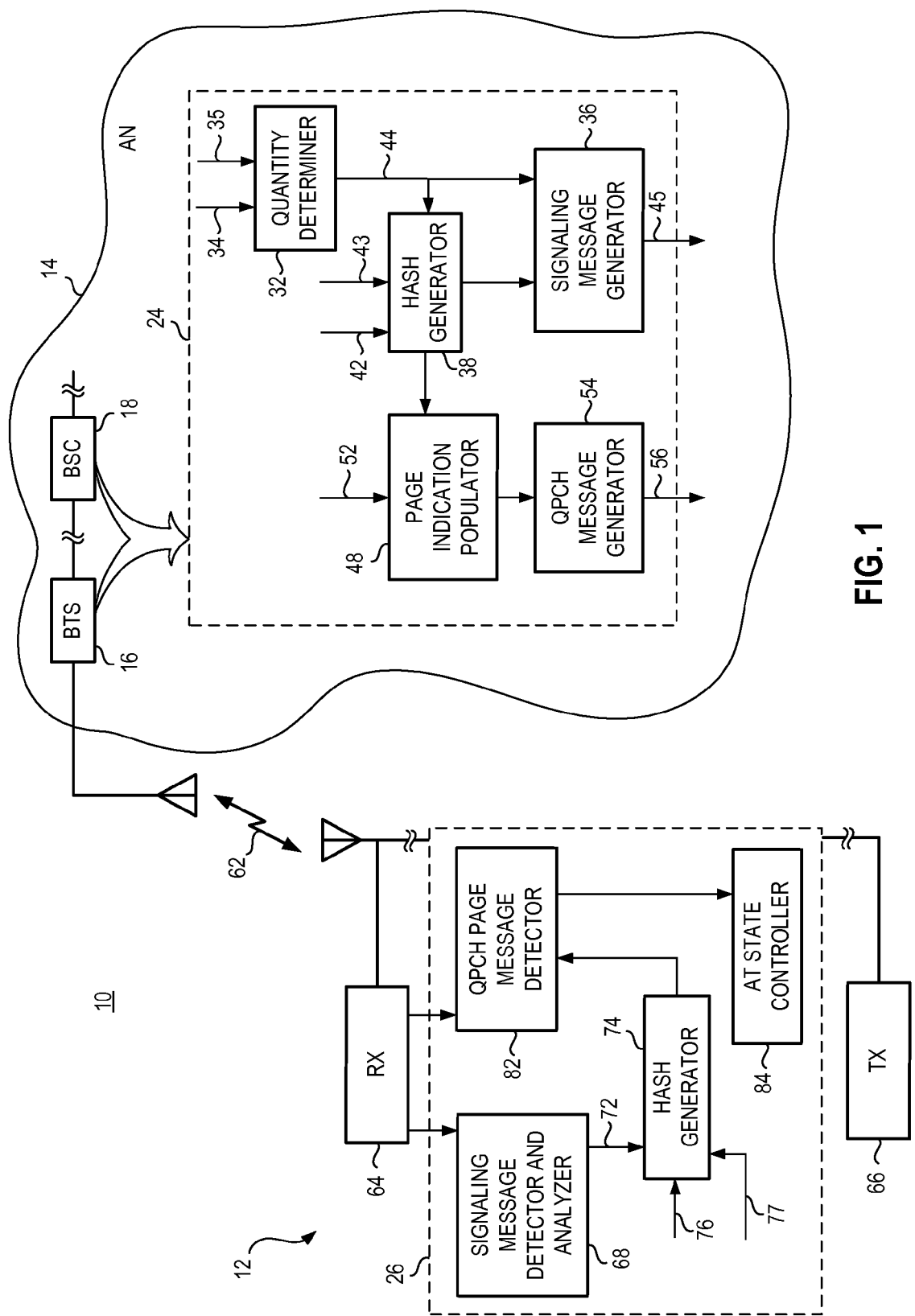
FIG. 1 illustrates a functional block diagram of a radio communication system in which an embodiment of the present invention is operable.

The present invention, accordingly, advantageously provides apparatus, and an associated method, by which to facilitate paging of an access terminal of a radio communication system to alert the access terminal of a pending call, or other communication.

Through operation of an embodiment of the present invention, a manner is provided that dynamically configures a quick page message, such as a quick page message generated and sent upon a QPCH (Quick Paging Channel). The quick page message configuration is dependent upon paging load or other indicia of communication activity in the communication system. As the paging load changes, the quick page message is reconfigured if a different configuration provides for a lessened probability of occurrence of false wakeup of an access terminal that monitors the quick page channel.

Selection of the number of page indications per page is made to minimize best the possibility of occurrence of a false wakeup. By reducing the likelihood of occurrence of false wakeup, excessive battery depletion that occurs as a result of false wakeup is less likely to occur.

In one aspect of the present invention, a quick page message is configured dynamically, depending upon the paging load, or other communication activity indicia, of the communication network. A selected number of available page indication locations of the quick page message that shall be populated with page indications is determined responsive to the input indicia. When the quick page message is of a prescribed number of page indication locations, such as thirty-five page indication locations, the number of page indication locations caused to be available to be populated with page indicators is thirty-five or fewer. Depending upon the paging load, or other input indicia, one or more of the page indication locations is allocated for identifying the number of page indications per page that are used in the quick page message. One or more page indication locations is also, or alternately, used for purposes of indicating whether a partial hash comparison or variable page indications per page scheme is utilized in the quick page message.

In another aspect of the present invention, the quick page message configurer also selects the number of page indications per page that shall be utilized for purposes of paging an access terminal. The number of page indications per page as well as the number of page indication locations that are configured to be made available for population with page indicators is selected to minimize the possibility of false wakeup.

In another aspect of the present invention, upon configuration of the quick page message, a signaling message generator generates a send message that includes an indication of the configuration of the quick page message. The signaling message identifies both the number of page indication locations of the quick page message and the number of page indications per page that shall be contained in the quick page message. And, if partial hash comparison is performed, the send message formed by the signaling message generator includes such an indication.

As the configuration is dynamic, reconfigurable when system paging load, or other communication activity indicia, changes, the quick page message is caused to be reconfigured, as appropriate. And, a signaling message is generated that identifies the reconfigured quick page message.

In another aspect of the present invention, hashing is performed at both an access network and at an access terminal using the same input number, such as a session seed defined in the CDMA2000 EV-DO operating specification standard or other pseudorandom number, or another input number, such as an access terminal identifier (ATI). Hashing is performed upon the input number in the same manner, independently, at the access network and at the access terminal. Multiple hashes are formed by hashing the input number in different manners, e.g., such as by rotating the bit sequence of the input number to create different hash values. The number of hash values that are generated corresponds, or is otherwise responsive to, the set number of page indications per page. Alternately, different hash functions are used to create the different hashes. Formation of the multiple hashes is sometimes referred to herein as multi-hashing. Each hash function operation is carried out in the same manner at the access network and at the access terminal so that the resultant hash values generated at the respective entities are identical. For instance, hashing is first performed at both the access network and at the access terminal upon the input number in non-rotated form. Then, the hashing is performed, again at both the access network and at the access terminal, upon the input number whose bits are rotated by a first number of bits. If additional hashing is performed, the access network and the access terminal both perform the hashing upon the input number, whose bits are further rotated, again in the same manner at the access network and at the access terminal. Bit rotation also decorrelates the hashed values.

In a further aspect of the present invention, the hashing is performed upon the input number by operation of a hash function, or algorithm, upon the input number. The hash function, e.g., is time-varying or otherwise, in some manner, generates hash values that are time-dependent. And, if multiple hash values are generated, viz. when the set number of page indications per page is two or more, the hash values are further caused to be dissimilar. That is to say, when multiple hash values are generated, a later-generated hash value is caused to be of a value different than any earlier-generated hash value.

In another aspect of the present invention, the access network identifies the number of hashes, and the corresponding number of page indications per page, that are to be included in a quick page message to page a particular access terminal. A signaling message is generated that includes an indication of the number of hashes or page indications per page that are going to be broadcast by the access network to a particular access terminal within a paging message. The access terminal, from this signaling message, ascertains the number of page indications that are going to be directed to the access terminal in the quick page message. Responsive to this received number, the access terminal performs hashing upon an input number to form an appropriate number of hash values, and such hash values are used pursuant to analysis of the page message, when received, to identify where in the page message to detect values of page indicators.

In another aspect of the present invention, the number of hashes performed by the access network and, correspondingly, the number of hashes performed at the access terminal, is a selectable number, selected to minimize the likelihood of occurrence of false wakeup. The number is selected, at least in part, based upon the number of pages that are to be made to other access terminals. And, more generally, the number of hashes is responsive to communication activity in the communication system. When many access terminals are paged, the number of page indications, and hash values, per access terminal is, e.g., a small value. And, conversely, when only a small number of access terminals are to be paged, the number of page indications, and hash values, is, e.g., large. Generally, the number of hash values and resultant page indications per access terminal, populated into a page message for a particular access terminal, is inversely proportional to the communication activity, that is, the number of other pages that are made to other access terminals during a particular period of operation of the communication system. Ideally, the number of page indications and hash values per access terminal is chosen in a way to minimize the probability of false wakeup.

In another aspect of the present invention, the hash values determine where in the page message that the page indications are populated. The hashing performed at the access network and at the access terminal are carried out in the same manners. The page indication locations of a page message in which the page indication values are populated are the same hash values that are generated at the access terminal, and the access terminal detects and analyzes the corresponding page indication locations of the page message, once received at the access terminal.

In another aspect of the present invention, in the event that any of the values of the page indications populating the page indication locations corresponding to the hash values indicate that the access terminal is not being paged, the access terminal enters into a sleep state. For instance, if the access terminal detects any page indication value to which the access terminal hashes and determines the access terminal is not being paged, the access terminal enters into a sleep state. Thereby, the access terminal is more quickly able to enter into a power-saving, sleep mode. Conversely, if the access terminal identifies a page indication value populating a page indication location that indicates that the access terminal is being paged and the access terminal knows that multiple page indications are broadcast to the access terminal in the quick page message, the access terminal monitors for the same page indication value in another page indication location to which the access terminal hashes. If the first positive indication is a false indication, monitoring of a second, or other, page indication locations prior to determining finally that the access terminal is being paged reduces the likelihood of occurrence of false wakeup. Thereby, the access terminal does not enter into an active state to receive a communication responsive to a false wakeup indication. Improved power consumption characteristics of the access terminal result, providing better battery longevity.

In these and other aspects, therefore, apparatus, and an associated method, is provided for an access network of a communication network that selectably generates a first page message on a first paging channel. A communication activity input indicia identifier is configured to identify communication activity input indicia of the communication network. A first page message configurer is adapted to receive indication of identification by the communication activity input indicia identifier of the communication activity input indicia. The first page message is configured to cause configuration of the first page message to include a selected number of available page indication locations of the first page message for population with page indications.

In these and further aspects, therefore, further apparatus, and an associated method, is provided for an access terminal that monitors a first paging channel for delivery of a first paging message. A send message detector is configured to detect a send message delivered separate from the first paging message. The send message includes an indication of configuration of the first paging message. A first paging message content detector is configured to detect contents of the first paging message in a manner responsive to the indication of the configuration of the first paging message indicated in the send message detected by the send message detector.

Referring first, therefore, to FIG. 1, a radio communication system, shown generally at 10, provides for communications with access terminals, of which the access terminal 12 is exemplary. The communication system forms a multi-user communication system that typically includes a large number of access terminals and a plurality of concurrent communication dialogs. While only a single access terminal is shown in FIG. 1, additional access terminals, analogous to the access terminal 12, typically form a portion of the communication system.

Communications are effectuated between an access terminal and a radio network 14, formed of fixed network infrastructure elements, such as a base transceiver station (BTS) 16 and a base station controller (BSC) 18. The access network encompasses a geographical area within which communications with the access network are possible. That is to say, when an access terminal is positioned within the area encompassed by the access network, the access terminal is generally able to communicate with the access network, and the access network is typically able to communicate with the access terminal.

The communication system is operable in general conformity with the operating protocols and parameters of an appropriate communication specification standard. The description set forth herein is exemplary, and the teachings of various embodiments of the present invention are implementable in any of various types of communication systems.

As previously mentioned, the access terminal is alerted, by broadcast of page messages when a communication, initiated at the network, is to be terminated at the access terminal. A quick paging channel (QPCH), or analogous channel, is defined. Quick page indications, populating a quick page message, are of values that identify whether an access terminal is being paged. However, also as noted previously, particularly during times of heavy usage, a false wakeup of the access terminal might occur due to a quick page indication in the message intended for one access terminal is broadcast within a slot that is also used by another of the access terminals. False wakeup prevents an access terminal from entering into a power-saving sleep mode.

Accordingly, pursuant to an embodiment of the present invention, the access network includes apparatus 24, and the access terminal includes apparatus 26, that operate to reduce the likelihood of the occurrence of false wakeup. The elements of the apparatus 24 and the apparatus 26 are functionally represented, implementable in any desired manner, including, for instance, by algorithms executable by processing circuitry.

The elements forming the apparatus 24 are implemented at any appropriate location of the access network 14, including, as illustrated, at the BTS 16 and BSC 18 or distributed amongst such entities as well as others.

Here, the apparatus 24 includes a page message configuration and page quantity per page determiner 32. The determiner is coupled to receive, as input indicia, indications of network activity on the line 34. The network activity is quantified, for instance, in a number of page values. The network is aware, e.g., of the number of access terminals that shall be paged. Or, the number of page values comprises, e.g., an expected number of pages, an average number of prior pages, or other paging quantity indicia. The number is representative of the paging load. The characteristics of the quick page message, viz., the number of page indication locations of the message are also made known to the determiner. Here, the line 35 is representative of such information provided to the determiner. In an exemplary implementation in which the characteristics of the message are static, the number of page indication locations, e.g., thirty-five page indication locations, is maintained at a storage element of the, or accessible by, the determiner. Responsive to the indication of the network activity, the determiner determines the configuration of the quick page message and the number of hashes that are to be generated, and the number of page indications per page, that are to be provided pursuant to paging of an access terminal in a quick paging message. As conditions, e.g., the paging load, change, the page message is reconfigured, and, if appropriate, the number of page indications per page also is changed.

In an alternate implementation, the number of hash values is a set number, e.g., a fixed number greater than one. The fixed number of two, e.g., appears to work well when the number of page indication locations in a quick page message is about one hundred eighty. The number of hash values and number of page indications correspond.

An indication of the determined quantity of page indications per page is provided to a signaling message generator and to a hash generator, a "hasher", 38. A number known to both the access network and to the access terminal, such as a session seed or other pseudorandom number, or a number such as an access terminal identifier (ATI) is also provided to the hash generator 38, here represented by way of the line 42. The hash generator hashes the number. That is to say, a hash function is performed upon the number to generate a hash value. Different hash values are provided by, e.g., rotating the number provided to the hash generator and performing the hash function, or algorithm, thereon. Multiple hash values are generated, for instance, by operating upon multiple rotations of the number, the number of hash values determined by the value provided to the hash generator on the line 44 by the determiner 32. With an ideal hash function, all values are equally likely to be generated. An exemplary hash function comprises a mathematical "modulo" operation. A time factor, known to both the access network and the access terminal, such as a system clock time, is, in one embodiment, further provided to, and used by, the hash generator in the formation of hash values. Such factor is represented by line 43 in FIG. 1.

The signaling message generator 36 to which the value determined by the determiner 32 is provided generates a signaling message, here generated upon the line 45, that identifies the quantities and page message configuration determined by the determiner. The signaling message is broadcast to the access terminal 12, thereby to alert the access terminal of the determined quantities and configuration.

The hash values created by the hash generator 38 are provided to a page indication populator 48. The page indication populator 48 is also provided with a network communication request, here provided by way of the line 52. The page indication populator selects page indication values depending upon whether the access terminal is to be paged. For instance, when an access terminal is to be paged, the page indication values are logical "1" values. In one implementation, all values are initially logical "0" values and then set as appropriate. The page indication values and their associated page indication locations, defined by the hash values generated by the hash generator 38, are provided to a QPCH, or other, message generator 54. The page message generator is also provided with configuration information determined by the determiner. The message generator forms a page message that includes a plurality of page indication locations corresponding in configuration to that selected by the determiner. The page indication populator populates selected page indication locations of the message with the page indication values. The locations populated with a page indication value are determined by the hash values generated by the hash generator 38. In like manner, page indications are formed for other access terminals and hash values are generated to define at where in the page message the page indications intended for other access terminals are populated in the message generated by the message generator 54. When the resultant message is broadcast by the access network, access terminals, such as the access terminal 12, are provided with an indication of whether the access terminal is to be paged, and, if the page message is configured pursuant to a partial hash comparison, such information is also part of the message.

Transceiver elements of the base transceiver station 16 cause broadcast of the messages generated by the message generators 36 and 54 of the apparatus 24 upon a radio air interface, represented in FIG. 1 by the arrow 62. The messages are delivered to the access terminal 12 as well as other access terminals within reception range of the broadcast message. The access terminal 12 includes transceiver circuitry, here represented by a receive part 64 and a transmit part 66. The receive part 64 operates to receive signals sent thereto, such as the messages generated by the apparatus 24 of the access network. And, certain of the detected signals are provided to the apparatus 26. Of significance here are detections of the signaling message generated by the signaling message generator 36 of the access network and of the page message generated by the message generator 54.

Indications are provided to a signaling message detector and analyzer 68. The detector and analyzer operate to detect the contents of the signaling message and analyze the detected message to ascertain the page message configuration and the number of page indications per access terminal indicated in the message. Indications are provided, here by way of the line 72, to a hash generator 74. The hash generator is also provided with values of the input number, here indicated to be provided by way of the line 76, known to both the access network and access terminal. The time factor, known to both the access network and access terminal is also provided to the generator 74, here represented by way of line 77. The hash generator operates in manners analogous to operation of the hash generator 38 of the access network to perform hash functions upon the input number. And, the input number provided to the hash generator corresponds to the input number provided to the hash generator 38 on the line 42. The number of hash values generated by the hash generator corresponds to the number identified by the detector and analyzer 68. If partial hash comparison is called for, the bits, i.e., page indication locations allocated thereto, are accordingly utilized. Hash values created by the hash generator are provided to a QPCH (Quick Paging Channel), or other, page message detector 82. The hash values created by the hash generator identify to the page message detector which of the page indication locations that should be monitored to determine whether a page is broadcast to the access terminal. The message broadcast by the access network and detected and operated upon by the access terminal is an atomic message. That is to say, all of the bits are received in a single message. Responsive to detections made by the detector, an indication is provided to an access terminal (AT) state controller 84 to control the state into which the access terminal is placed.

In the event that the first quick page indication slot monitored by the message detector indicates no page message broadcast to the access terminal, the state controller places the access terminal into a sleep mode. If a first of the quick page indication slots monitored by the detector indicates a page to have been broadcast, but a second of the quick page indication slots monitored by the detector indicates no page, the state controller also causes the access terminal to enter into a low-power, sleep mode. Additional page indications, if more than two, are analogously monitored. The occurrence of a false wakeup is reduced as one or more additional quick page indications are monitored to provide further indication of whether a page has been sent to the access terminal, and the number of page indications per page is selected to minimize the false wakeup occurrence.

Figure 2:
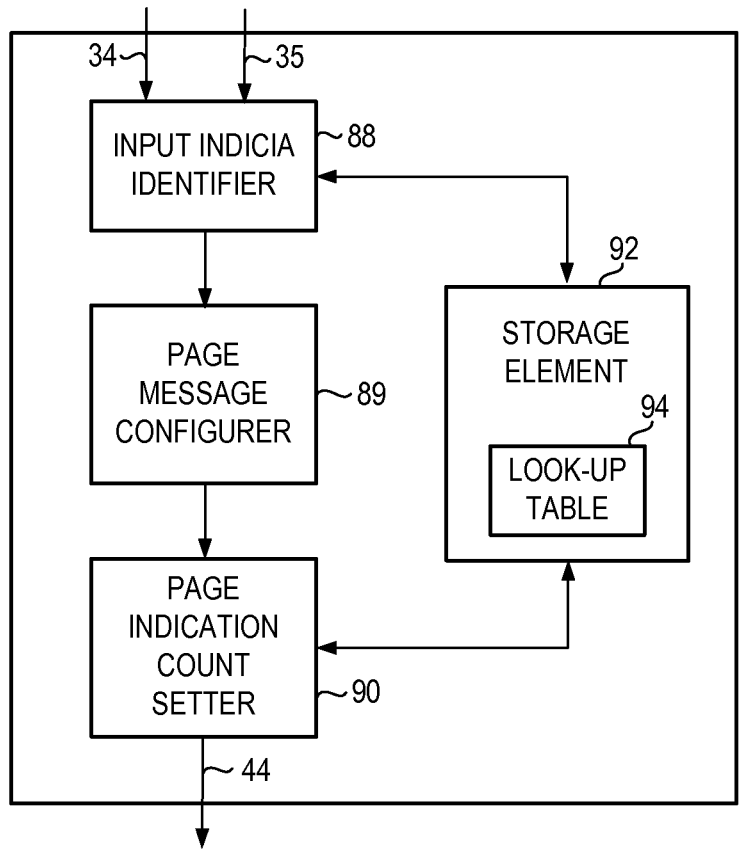
FIG. 2 illustrates a functional block diagram of the determiner that forms part of the communication system shown in FIG. 1.

FIG. 2 illustrates a representation of the page message configuration and page quantity per page determiner 32 that forms a part of the apparatus 24 of the access network shown in FIG. 1. The determiner is here shown to include a communication activity input indicia indicator 88, a first page message configurer 89, and a page indication count setter 90. The elements of the determiner are functionally represented, implementable in any desired manner, including by algorithms executable by processing circuitry.

Again, lines 34 and 35 are representative of inputs identifying network activity and quick page message characteristics, respectively. The identifier 88 operates to detect the values of the inputs provided thereto. The network activity provided to the identifier provides an indication of the paging load in the communication system. If the quick page message characteristics, that is to say, the number of page indication locations, or bits, of the quick page message are a prescribed value, such as thirty-five, the value is maintained at the determiner, and need not be repeatedly provided thereto.

Indications of the input indicia identified by the identifier are provided to a first page message configurer 89 and to a page indication counter setter 90. The first page message configurer operates to select a configuration of the first page message, that is, the number of the available page indication locations of the page message that shall be used to be populated with page indication values and how many, if any, of the page indication locations shall be used for other purposes. And, the page indication count setter operates to select the number of page indications per page that shall be used to page an access terminal in the resultant page message. Selections made by the configurer and setter 89 and 90 are provided to the signaling message generator, the hash generator, and the QPCH message generator 54, as described above with respect to FIG. 1. By way of example, the page message configuration and the page indication count per page is dependent upon the paging load. If the paging load is consistently heavy, e.g., the paging load is consistently greater than fifteen pages per quick paging message, configuration of the message is made such that all of the page indication locations of the message are used for population with page indication values. Alternately, during a period of time in which the paging load varies consistently between, e.g., ten to twenty pages per quick page message, configuration of the quick paging is made such that a single page indication location is used to indicate whether there are one or two page indications per page. And, the remaining paging indication locations are used for population with page indication values. Alternately, if the paging load is varying consistently between, e.g., ten and sixteen pages per quick paging message, configuration of the quick paging message is selected such that two page indications per page are used and all of the page indication locations of the message are used for population with page indication values. Alternately, if the paging load is varying consistently between, e.g., six and fifteen pages per message, configuration of the message is selected such that a single bit is used to indicate whether there are two or three page indications per page, and the remaining page indication locations are used for population with page indication values. Alternately, e.g., if the paging load is varying consistently between six and twenty pages per quick paging message, the quick paging message is configured such that two bits are used to indicate whether there are one, two, three, or four page indications per page, and the remaining page indication locations are used for population with page indication values. Alternately, if the paging load is varying consistently between zero and nine pages per quick paging message, configuration of the message is selected such that one page indication location is used to indicate whether partial hash comparison is to be performed or whether variable page indications per page operation is used. When partial hash comparison is used, an additional two page indication locations are used to indicate whether one, two, three, or four access terminals are being paged. And, the remaining, e.g., thirty-two, page indication locations are used to specify partial hashes. And, in the event of variable page indications per page, an additional two page indication locations are used to indicate whether there are one, two, three, or four page indications per page, and the remaining page indication locations are used for population with page indication values.

The signaling message generated by the generator 36 comprises, or includes, an extended channel information message that includes, or is formed of, a four-bit field. In exemplary operation, the CRC (Cyclic Redundancy Code) of the quick paging message is scrambled by a signature that is broadcast on an out-of-band configuration channel. The access terminal that receives the message then receives full configuration information in the extended channel information when the decoding of the CRC fails. In addition to allowing for various configurations, the concept of partial hash comparison is merged with the use of various page indications per page. For the occurrence of one to five pages, the access network places a portion of a hash of paged access terminals' ATIs (Access Terminal Identifiers) in the quick paging message. Access terminals that detect a message, compare the values of the hashes of their respective ATIs to the partial bits in the quick paging message. An access terminal monitors for a page only if any of the partial hashes match.

In another implementation, alternately, the calculations for a plurality of possible combinations are pre-calculated and stored at a look-up table. The contents of the look-up table are accessed, and comparisons are made between different values stored threat, all to determine the number of page indications per page that shall be included in the quick page channel message.

The signaling message, as above-noted, comprises, or is formed of an Extended Channel Info Message. Its exemplary format and exemplary value-definitions follow.

Extended Channel Info Message

| Field | Bits |
| --- | --- |
| [...] | |
| QPCHconfiguration | 4 |
| [...] | |

QPCH Configuration Definition

| Value | Meaning |
| --- | --- |
| '0000' | Partial Hash Comparison and Variable PIs per page included |
| '0001' | Variable PIs per page included (1-4 PIs per page) |
| '0010' | Variable PIs per page included (1-2 PIs per page) |
| '0011' | Variable PIs per page included (2-3 PIs per page) |
| '0100' | Variable PIs per page included (3-4 PIs per page) |
| '0101' | Only PIs included (1 PI per page) |
| '0110' | Only PIs included (2 PIs per page) |
| '0111' | Only PIs included (3 PIs per page) |
| '1000' | Only PIs included (4 PIs per page) |
| '1001' to '1111' | Reserved |

The following exemplary structure is used for the QPCH message when the QPCH configuration is set to '0000':

| Field | Bits |
| --- | --- |
| PartialComparison | 1 |
| RemainingBits | 34 |

PartialComparison are set to '1' if 1, 2, 3, or 4 ATs are being paged; otherwise PartialComparison are set to '0'.

If Partial Comparison is set to '1' the RemainingBits field is set as follows:

| Field | Bits |
| --- | --- |
| NumberOfPages | 2 |
| ComparisonBits | 32 |

NumberOfPages Definition

| Value | Meaning |
| --- | --- |
| '00' | 1 AT is being paged |
| '01' | 2 ATs are being paged |
| '10' | 3 ATs are being paged |
| '11' | 4 ATs are being paged |

The RemainingBits field is set as follows if NumberOfPages is set to '00':

| Field | Bits |
| --- | --- |
| 32Comparison | 32 |

32Comparison is set to the 32 bits associated with the AT being paged that ATs are to compare with to determine if they are being paged.

The RemainingBits field shall be set as follows if NumberOfPages is set to '01':

| Field | Bits |
| --- | --- |
| 16Comparison1 | 16 |
| 16Comparison2 | 16 |

16Comparison1 and 16Comparison2 are set to the 16 bits associated with the two ATs being paged that ATs are to compare with to determine if they are being paged.

The RemainingBits field is set as follows if NumberOfPages is set to '10':

| Field | Bits |
| --- | --- |
| 10Comparison1 | 10 |
| 10Comparison2 | 10 |
| 10Comparison3 | 10 |

10Comparison1, 10Comparison2, and 10Comparison3 are set to the 10 bits associated with the three STs being paged that ATs are to compare with to determine if they are being paged.

The RemainingBits field is set as follows if NumberOfPages is set to '11':

| Field | Bits |
| --- | --- |
| 8Comparison1 | 8 |
| 8Comparison2 | 8 |
| 8Comparison3 | 8 |
| 8Comparison4 | 8 |

8Comparison1, 8Comparison2, 8Comparison3, and 8Comparison4 are set to the 8 bits associated with the four ATs being paged that ATs are to compare with to determine if they are being paged.

If Partial Comparison is set to '0', the RemainingBits field is set as follows:

| Field | Bits |
|---|---|
| PIsPerPage | 2 |
| PIs | 32 |

PIsPerPage Definition

| Value | Meaning |
|---|---|
| '00' | 1 PI per page |
| '01' | 2 PIs per page |
| '10' | 3 PIs per page |
| '11' | 4 PIs per page |

The PIs field contains the hashed paging indicators. For each AT (access terminal) being paged, there are either 1, 2, 3, or 4 PIs per page, depending upon the setting of PIsPerPage.

The following structure is used for the QPCH message when the QPCHconfiguration is set to '0001':

| Field | Bits |
|---|---|
| PIsPerPage | 2 |
| PIs | 33 |

PIsPerPage Definition

| Value | Meaning |
|---|---|
| '00' | 1 PI per page |
| '01' | 2 PIs per page |
| '10' | 3 PIs per page |
| '11' | 4 PIs per page |

The PIs field contains the hashed paging indicators. For each AT being paged, there are either 1, 2, 3, or 4 PIs per page, depending upon the setting of PIsPerPage.

The following structure is used for the QPCH message when the QPCHconfiguration is set to '0010':

| Field | Bits |
|---|---|
| PIsPerPage | 1 |
| PIs | 34 |

PIsPerPage Definition

| Value | Meaning |
|---|---|
| '0' | 1 PI per page |
| '1' | 2 PIs per page |

The PIs field contains the hashed paging indicators. For each AT being paged, there are either 1 or 2 PIs per page, depending upon the setting of PIsPerPage.

The following structure is used for the QPCH message when the QPCHconfiguration is set to '0011':

| Field | Bits |
|---|---|
| PIsPerPage | 1 |
| PIs | 34 |

PIsPerPage Definition

| Value | Meaning |
|---|---|
| '0' | 2 PI per page |
| '1' | 3 PIs per page |

The PIs field contains the hashed paging indicators. For each AT being paged, there are either 2 or 3 PIs per page, depending upon the setting of PIsPerPage.

The following structure is used for the QPCH message when the QPCHconfiguration is set to '0100':

| Field | Bits |
|---|---|
| PIsPerPage | 1 |
| PIs | 34 |

PIsPerPage Definition

| Value | Meaning |
|---|---|
| '0' | 3 PIs per page |
| '1' | 4 PIs per page |

The PIs field contains the hashed paging indicators. For each AT being paged, there are either 3 or 4 PIs per page, depending upon the setting of PIsPerPage.

The following structure is used for the QPCH message when the QPCHconfiguration is set to '0101';

| Field | Bits |
|---|---|
| PIs | 35 |

The PIs field contains the hashed paging indicators. For each AT being paged, there is 1 PI per page.

The following structure is used for the QPCH message when the QPCHconfiguration is set to '0110':

| Field | Bits |
|---|---|
| PIs | 35 |

The PIs field contains the hashed paging indicators. For each AT being paged, there are 2 PIs per page.

The following structure is used for the QPCH message when the QPCHconfiguration is set to '0111':

| Field | Bits |
|---|---|
| PIs | 35 |

The PIs field contains the hashed paging indicators. For each AT being paged, there are 3 PIs per page.

The following structure is used for the QPCH message when the QPCHconfiguration is set to '1000':

| Field | Bits |
|---|---|
| PIs | 35 |

The PIs field contains the hashed paging indicators. For each AT being paged, there are 4 PIs per page.

The format and value-definitions are exemplary. In other implementations, the signaling message is formed and defined in other manners.

Through operation of an embodiment of the present invention, false wakeup probability is reduced.

FIGS. 3, 4, 5, and 6 illustrate tables that list exemplary false wakeup probabilities when quick page messages of various configurations, i.e., allocations of page indication locations, are populated with page indication values. The table of FIG. 3 is representative of false wakeup probabilities when thirty-two page indication locations are used. The table of FIG. 4 is representative of false wakeup probabilities when thirty-three page indication locations are used. And, FIGS. 5 and 6 are representative of exemplary probabilities when thirty-four and thirty-five PI locations are used. Highlighted portions indicate the number of page indications per page that provide the lowest false wakeup probabilities for various numbers of pages.

Figure 7:
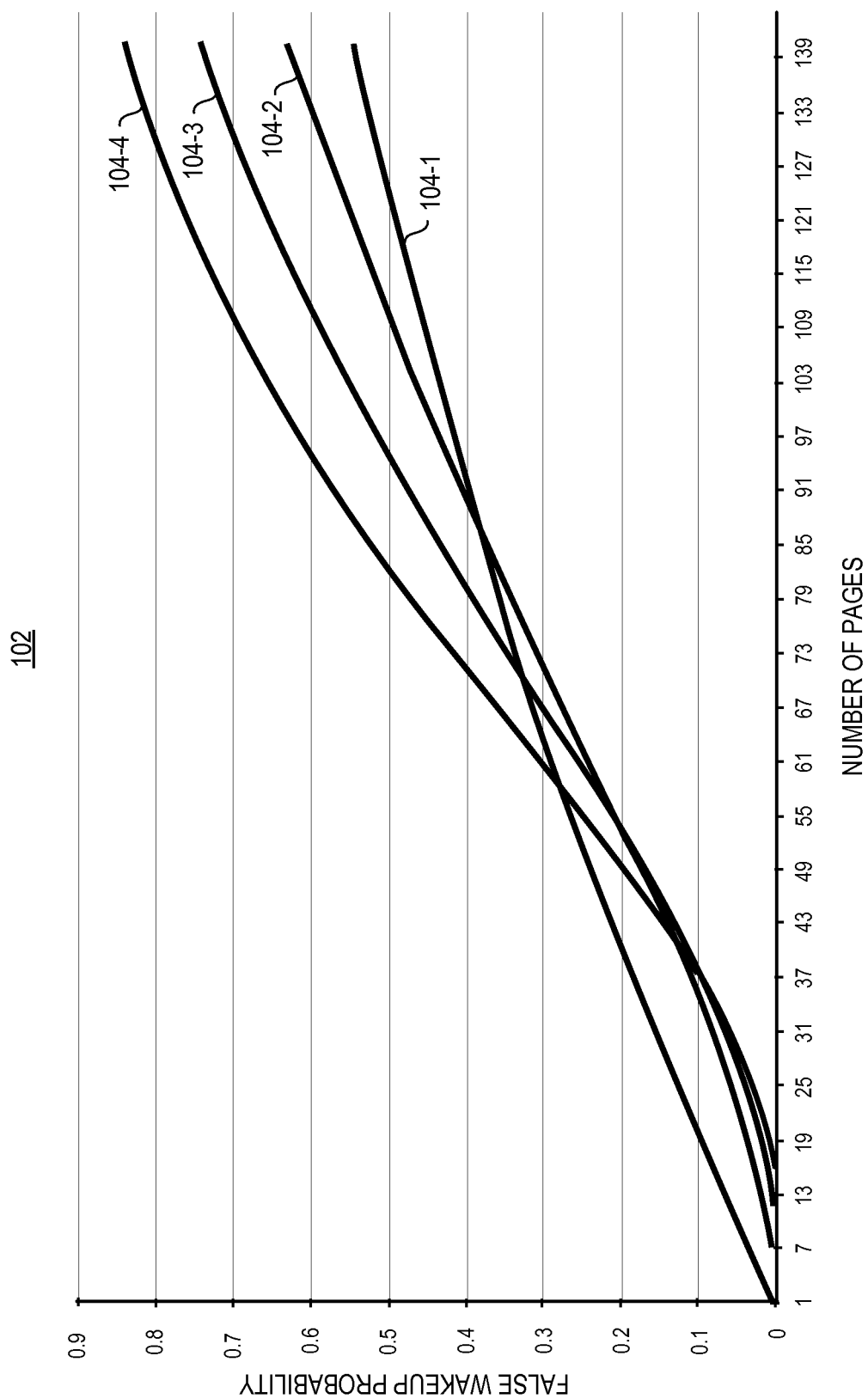
FIG. 7 illustrates a graphical representation of the relationship between the probability of occurrence of a false wakeup as a function of the number of pages in a multi-user communication system for various numbers of hashes.

FIG. 7 illustrates a graphical representation, shown generally at 102, that shows the relationship between the occurrence of false wakeup and the number of pages in the communication system 10 shown in FIG. 1, pursuant to exemplary operation. Plots 104 illustrate the general proportional relationship between the number of pages to access terminals in a multi-user communication scheme and the occurrence of false wakeup, represented in terms of probability. Four plots, plots 104-1, 104-2, 104-3, and 104-4, are shown. The plot 104-1 is representative of the relationship when a single page indication is provided to a particular access terminal in a page message to alert the access terminal of the page. A single hash value is generated, and the page indication is populated in a single page indication location determined by the single hash value. The plot 104-2 is representative of two page indication bits provided in the page message to alert a particular access terminal of the page. Two hash values are generated, and the page indication locations in which the page indications are positioned are determined by the two hash values. The plot 104-3 is representative of use of three page indications in a page message to alert a particular access terminal of the page. Three hash values are generated and their values are determinative of the positioning of the three page indication locations in which the page indications are populated. And, the plot 104-4 is representative of the relationship between false wakeup occurrence when four page indications are used in a page message to page the access terminal.

Review of the plots shows that the number of page indications in a page message that provides the lowest false wakeup probability for a given number of pages in the communication system, i.e., network activity, varies with the number of pages. Pursuant to operation of an embodiment of the present invention, advantage is taken of this relationship in the selection of the number of page indications to use per access terminal. Such selection is made, e.g., by the determiner 32 shown in FIG. 1. Selection is made in such a way as to minimize the false wakeup probability. For each number of pages, i.e., network activity, selection is made of the number of page indications that are to be used to page, in the quick page message, an access terminal. Using, for instance, plots analogous to the plots 104 shown in FIG. 7, the lowest curve for each of the number of pages, i.e., network activity, is selected. Analysis indicates that, when a number of pages is relatively small, the lowest probability of false wakeup occurs when greater number of page indications per access terminal are utilized.

Conversely, at higher numbers of pages, i.e., network activity, lesser numbers of page indications provides the lowest false wakeup probabilities. Changeover occurs at various thresholds, indicated in the representation of FIG. 7 when plots cross one another.

Once determination and selection is made at the access network, indication of the selection is provided to an access terminal. The number of page indications, known at both the access network and at the access terminal, permits operation of the apparatus 24 and 26 in coordinated manner. In the exemplary implementation, the page indication values populating a quick page message are all received in the same message. The access terminal need not wake up at different times for separate bits as all of the bits of the message are received at once in the same message. Furthermore, the same page indicator values are hashed instead of, as previously utilized, making divisions into multiple physical groups. And, the page indication locations defined by the hash values are further able to be generated in a manner such that the page indication locations are dissimilar. Rotation of the input number used in the generation of the hash values decorrelates the hash values, and the introduction of time variance in the hash function also provides for hash value dissimilarity.

Figure 8:
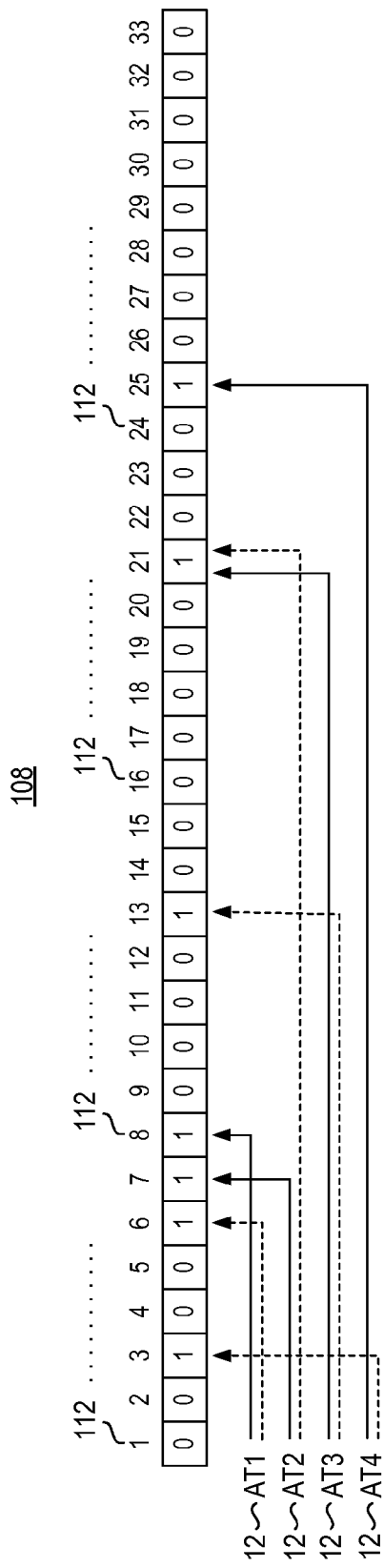
FIG. 8 illustrates an exemplary quick page message generated pursuant to operation of an exemplary embodiment of the present invention.

FIG. 8 illustrates part of an exemplary quick page message, shown generally at 108. The message is generated, for instance, with respect to the configuration shown in FIG. 1, at the message generator 54. The quick page message includes a plurality, here 33, page indication locations 112, numbered as 1-33. Initially, each page indication location is set to logical "0" values. Page indications for four access terminals 12, identified as AT1, AT2, AT3, and AT4, are represented in the message 108. A hash generator generates hash values of 8 and 6 for the access terminal AT1. And, page indication locations 8 and 6 are populated with values to indicate whether the access terminal AT1 is paged. Here, the logical values "1" are inserted into the page indication locations 8 and 6 that identify that the AT1 is paged. Analogously, with respect to the access terminal AT2, the hash generator generates hash values of 7 and 21, and page indications are inserted into page indication locations 7 and 21 to identify that the access terminal AT2 is paged. Hash values 21 and 13 generated with respect to the access terminal AT3 cause page indication locations 21 and 13 to be populated with page indication bits to identify, here, that the access terminal AT3 is paged. And, hash values generated with respect to the access terminal AT4 of 25 and 3 cause the page indication locations 25 and 3 to be populated with page indication bits, here again to identify that the access terminal AT4 is paged. In this implementation, any of the page indication locations of the message 108 are available to be populated with page indication bits associated with any of the access terminals. And, as indicated at the page indication location 21, a page indication location might include a page indication bit associated with more than one of the access terminals. Ideally, the hash generator generates hash values that permit even, viz. equal, distribution of page indication values across the entire message 108. Each hash for a particular access terminal hashes over the same page indication location in contrast to conventional procedures. And, through use of the time factor, the occurrence of repeated generation of hash values of similar values, and corresponding population of the same page indication locations, for a particular access terminal, is unlikely.

Figure 9:
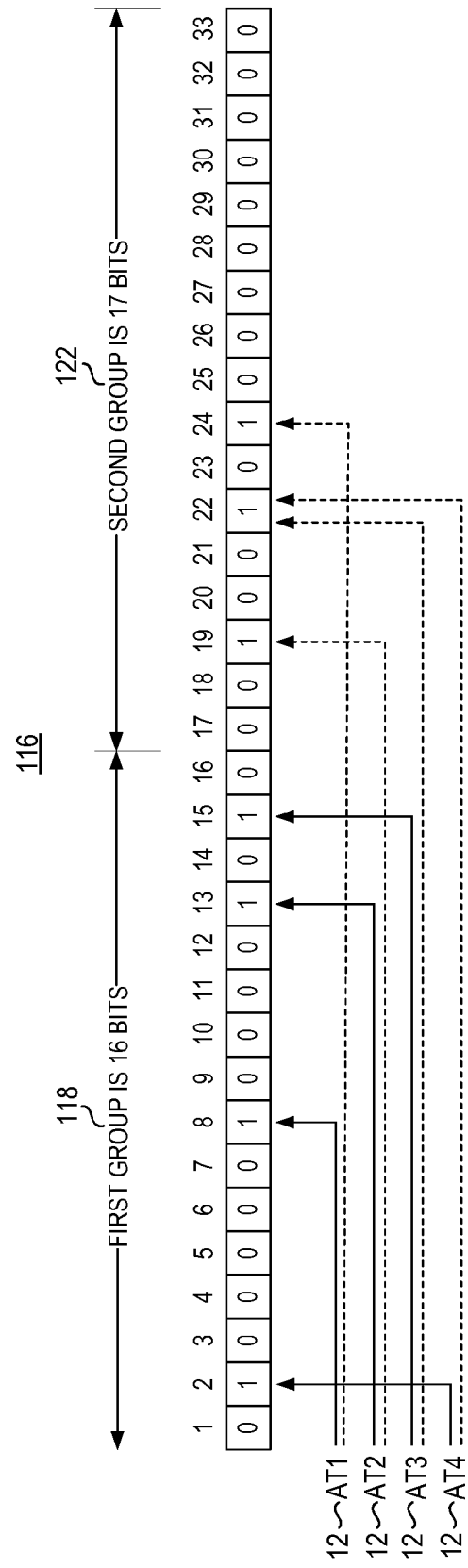
FIG. 9 illustrates an exemplary quick page message generated pursuant to operation of another exemplary embodiment of the present invention.

FIG. 9 illustrates part of another message, here shown generally at 116 that also includes thirty-three page indication locations 112 that are populated with page indication values, here again to page access terminals AT1, AT2, AT3, and AT4. Here, the message is divided into two groups, a first group 118, and a second group 122. Initially, here also, each page indication location is set to logical "0" values. In this implementation, only a single page indication location per group is available for page indicator values associated with a particular access terminal. That is to say, with respect to the access terminal AT1, a single page indication location in the first group is available, and a single page indication location in the second group is available. When a hash value generated by the hash value generator is of a value within the first group, another hash value must be of a value within the second group. Ideally, the hash generator generates hash values that permit even distribution of page indication values across each group of the message. And, as shown in the representation of FIG. 9, a page indication location is available to each of the access terminals in the first group and in the second group. The example shown in FIG. 9 is for an implementation in which two page indication bits are available within the page message per access terminal. If additional page indication bits are available, the page message is divided into additional numbers of groups of substantially equal size, and the page indication locations are correspondingly made available in each of the additional numbers of groups.

Figure 10:
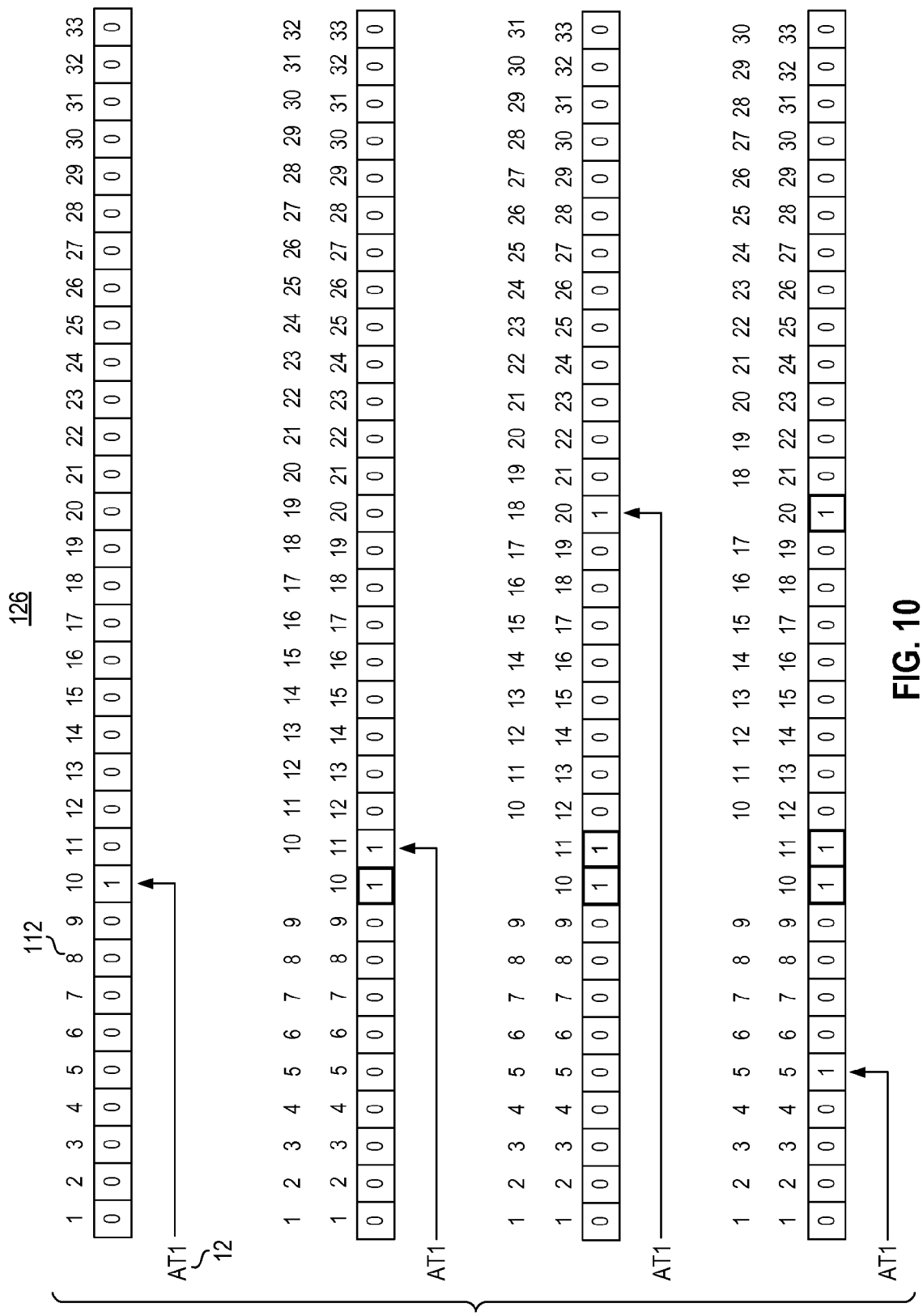
FIG. 10 illustrates formation of an exemplary quick page message pursuant to operation of another exemplary embodiment of the present invention.

FIG. 10 illustrates a quick page message 126 and the manner by which a hash generator operates pursuant to another embodiment. Here, four page indication locations are made available to the access terminal AT1 over the thirty-three bits of the quick page message. And, again, each page indication location is initially set to logical "0" values. When a hash value is selected and the page indication location determined therefrom is used, that page indication location is no longer available to that access terminal at which to populate the message with another page indication value. That is to say, a hash value cannot be repeated for that access terminal. In the representation shown in FIG. 10, a first page indication value is populated in page indication location 10. Here also, ideally, the hash generator generates hash values that permit even distribution of page indications across all of the available page indication locations. As noted below, when a page indication location is used, the location becomes no longer available. Page indication location 10 is no longer available for the access terminal AT1. A next-generated hash value is of 11 and a page indication bit is inserted into the page indication location 11. Thereafter, neither page indication locations 10 nor 11 are available. A subsequently-generated hash value of 20 causes the page indication value to be inserted into page indication location 20. And, thereafter, page indication locations 10, 11, and 20 are no longer available. A fourth-generated hash value of 5 is generated, and the page indication location 5 is populated with a page indication value. In this implementation, use of a time factor is generally not required.

Figure 11:
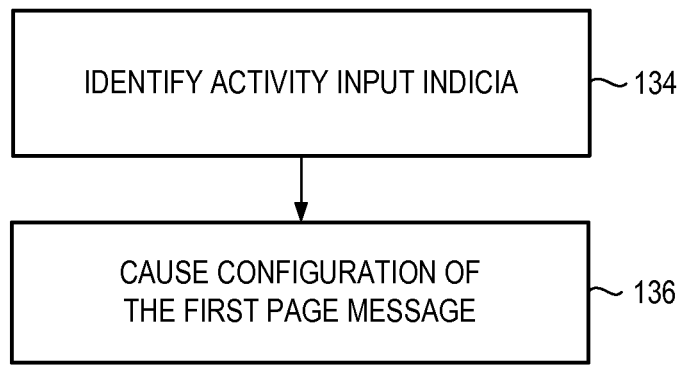
FIG. 11 illustrates a method flow diagram representative of the method of operation of an embodiment of the present invention.

FIG. 11 shows a method flow diagram, shown generally at 132, representative of exemplary operation of an embodiment of the present invention for selecting, at a communication network, a page indication count of page indications per page to be included in a first page message.

First, and as indicated by the block 134, communication activity input indicia of the communication network is identified. Then, and as indicated by the block 136, the configuration of the first page message is caused to include a selected number of page indication locations of the first page message for population with page indications.

Thereby, through operation of an embodiment of the present invention, an access terminal is able better, and quickly, to determine whether a page is broadcast thereto. If a quick page message, page indication location to which the access terminal hashes fails to include an indication that the access terminal is being paged, the access terminal enters into a reduced power state. The occurrence of false wakeup is less likely to occur due to the selection of page indications per page that minimizes the occurrence of false wakeup of an access terminal.

The previous descriptions are of preferred examples for implementing the invention, and the scope of the invention should not necessarily be limited by this description. The scope of the present invention is defined by the following claims.

What is claimed is:

1. A method in an access network apparatus, said method comprising:
   selecting a format for a page message, the format selected from a plurality of page message formats that utilize page indications and that include at least a first format having a first number of one-bit page indicators per access terminal page and a second format having a different, second number of one-bit page indicators per access terminal page;
   generating a signaling message that includes a configuration field set to a configuration value to indicate which format for the page message was selected, the configuration value being one of a first value to indicate the first format for the page message and a second value to indicate the second format for the page message;
   transmitting the signaling message over a configuration channel that is different from a paging channel;
   generating the page message according to the selected format; and
   transmitting the page message over a paging channel.

2. The method of claim 1, wherein the page message includes page indicator locations having page indicators, said page indicator locations locatable using hash values, said page indicators at said page indicator locations being indicative of an access terminal page.

3. The method of claim 2, wherein said hash values are based at least in part upon the configuration value.

4. The method of claim 1, wherein the first format is used for a page message having two page indicators per access terminal page, and the second format is used for a page message having three page indicators per access terminal page.

5. The method of claim 1, wherein the signaling message is comprised of an extended channel information message.

6. The method of claim 1, wherein a portion of page message is scrambled by a signature that is transmitted over the configuration channel.

7. A method in an access network apparatus, said method comprising:
   selecting a format for a page message, the format selected from a plurality of page message formats that utilize page indications and that include at least a first format having a first number of one-bit page indicators per access terminal page and a second for mat having a different, second number of one-bit page indicators per access terminal page;
   generating a signaling message that includes a configuration field set to a configuration value to indicate which format for the page message was selected, the configuration value being one of a first value to indicate the first format for the page message and a second value to indicate the second format for the page message;

thereafter, subsequent to access-terminal reception of the signaling message:

transmitting the signaling message over a configuration channel that is different from a paging channel;

generating the page message according to the selected format; and transmitting the page message over a paging channel.

8. The method of claim 7, wherein the page message includes page indicator locations having page indicators, said page indicator locations locatable using hash values, said page indicators at said page indicator locations being indicative of an access terminal page.

9. The method of claim 8, wherein said hash values are based at least in part upon the configuration value.

10. The method of claim 7, wherein the first format is used for a page message having two page indicators per access terminal page, and the second format is used for a page message having three page indicators per access terminal page.

11. The method of claim 7, wherein the signaling message is comprised of an extended channel information message.

12. The method of claim 7, wherein a portion of page message is scrambled by a signature that is transmitted over the configuration channel.

13. The method of claim 7 wherein the signaling message generated during said generating the signaling message comprises a multiple-bit field forming the configuration field.

14. A method in an access network apparatus, said method comprising:

selecting a format for a page message, the format selected from a plurality of page message formats that utilize page indications and that include at least a first format having a first number of one-bit page indicators per access terminal page and a second for mat having a different, second number of one-bit page indicators per access terminal page;

generating a signaling message that includes a configuration field set to a configuration value to indicate which format for the page message was selected, the configuration value being one of a first value to indicate the first format for the page message and a second value to indicate the second format for the page message;

transmitting the signaling message over a configuration channel that is different from a paging channel;

generating the page message according to the selected format; and transmitting the page message over a paging channel, such that, once received, the page message is operated upon to determine access-terminal paging through detection of page indication values of page indication location of the page message, known based upon the configuration value.

* * * * *